US012466097B2

(12) United States Patent
Mossberg et al.

(10) Patent No.: US 12,466,097 B2
(45) Date of Patent: Nov. 11, 2025

(54) CUTTING UNIT

(71) Applicant: Tetra Laval Holdings & Finance S.A., Pully (CH)

(72) Inventors: Ulf Mossberg, Löddeköpinge (SE); Göran Hermodsson, Staffanstorp (SE)

(73) Assignee: Tetra Laval Holdings & Finance S.A., Pully (CH)

( * ) Notice: Subject to any disclaimer, the term of this patent is extended or adjusted under 35 U.S.C. 154(b) by 321 days.

(21) Appl. No.: 17/792,106

(22) PCT Filed: Jun. 21, 2021

(86) PCT No.: PCT/EP2021/066826

§ 371 (c)(1),
(2) Date: Jul. 11, 2022

(87) PCT Pub. No.: WO2021/259857

PCT Pub. Date: Dec. 30, 2021

(65) Prior Publication Data

US 2023/0081606 A1 Mar. 16, 2023

(30) Foreign Application Priority Data

Jun. 26, 2020 (EP) .................................... 20182528

(51) Int. Cl.
*B26D 1/40* (2006.01)
*B26D 1/00* (2006.01)
(Continued)

(52) U.S. Cl.
CPC ........... *B26D 1/405* (2013.01); *B26D 7/2628* (2013.01); *B26D 9/00* (2013.01); *B26F 1/20* (2013.01);
(Continued)

(58) Field of Classification Search
CPC ........ B26D 1/405; B26D 7/2628; B26D 9/00; B26D 2001/0053; B26D 2001/006; B26D 2001/0066; B26F 1/20
See application file for complete search history.

(56) References Cited

U.S. PATENT DOCUMENTS 1,823,031 A * 9/1931 Dalen ................ H01M 50/463 144/241
2,769,496 A * 11/1956 Spinner .................... B26F 1/10 83/660
(Continued)

FOREIGN PATENT DOCUMENTS

JP 2006240680 A 9/2006
JP 2013082474 A * 5/2013
(Continued)

OTHER PUBLICATIONS

European Patent Office; F-IV, 3.9.2 Cases where method steps require specific data processing means and/or require additional technical devices as essential features—Guidelines for Examination; Nov. 1, 2019; retrieved from Internet: https://www.epo.org/law-practice/legal-texts/html/guidelines/e/f_iv_3_9_2.htm.
(Continued)

*Primary Examiner* — Adam J Eiseman
*Assistant Examiner* — Fernando A Ayala
(74) *Attorney, Agent, or Firm* — Renner, Otto, Boisselle & Sklar, LLP

(57) ABSTRACT

A cutting unit for providing transversal cuts and/or perforations to a string of packaging containers connected by transversal seals is provided. The cutting unit comprises a knife assembly and an anvil assembly rotatable against each other to form a nip for receiving a transversal seal of the string of packaging containers. The anvil assembly comprises an anvil blade having a first region and a second region such that when the first region is aligned with a knife
(Continued)

blade of the knife assembly at the nip a cut is produced, and when the second region is aligned with the knife blade at the nip a perforation is produced. A method, a computer program and a computer-readable medium storing the computer program for providing transversal cuts and/or perforations to a string of packaging containers connected by transversal seals are also described.

12 Claims, 9 Drawing Sheets

(51) Int. Cl.

| | |
|---|---|
| ***B26D 7/26*** | (2006.01) |
| ***B26D 9/00*** | (2006.01) |
| ***B26F 1/20*** | (2006.01) |

(52) U.S. Cl.

CPC ................ *B26D 2001/0053* (2013.01); *B26D 2001/006* (2013.01); *B26D 2001/0066* (2013.01)

(56) References Cited

U.S. PATENT DOCUMENTS 2,781,095 A * 2/1957 Spinner ..................... B26F 1/10 412/37
2,842,202 A * 7/1958 Boyd ...................... B41F 19/00 144/24.1
3,858,469 A * 1/1975 Hibbing .................... E04D 5/12 83/660
4,020,725 A * 5/1977 Climo ....................... B26F 1/10 83/349
5,088,309 A * 2/1992 Knudson .................. B21D 5/08 72/181
5,533,431 A * 7/1996 Schickling ................ B26F 1/44 83/854
5,582,571 A * 12/1996 Simpson ................... B26F 1/22 493/402
6,311,601 B1 * 11/2001 Love ......................... B26F 1/44 83/885
10,005,197 B2 * 6/2018 Kien ...................... A47K 10/16
2005/0077171 A1 * 4/2005 Hagemann ............. B65H 29/18 204/164
2009/0239727 A1 * 9/2009 Wingate .................... B26F 1/20 493/356
2011/0036058 A1 * 2/2011 Howdeshell ......... B26D 1/0006 83/13
2011/0308406 A1 * 12/2011 McNeil ..................... B26F 1/26 101/32
2012/0098184 A1 * 4/2012 Lewalski ................. B65H 9/16 271/145
2012/0245011 A1 * 9/2012 De Matteis ............ B65H 35/08 83/13
2015/0298340 A1 * 10/2015 Baggot ..................... B26F 1/20 83/509
2016/0016351 A1 * 1/2016 Siewert ................... B29C 53/02 264/163
2016/0121507 A1 * 5/2016 Smithwick .............. B26F 1/384 83/882
2017/0326747 A1 * 11/2017 Greve .................. B26D 1/0006
2017/0341797 A1 * 11/2017 Kim .......................... B26F 1/10
2019/0161312 A1 * 5/2019 Meyerhans .............. B26D 9/00

FOREIGN PATENT DOCUMENTS

JP 2017013877 A 1/2017
JP 2018162074 A 10/2018
WO 1997030828 A1 8/1997
WO 2018208311 A1 11/2018

OTHER PUBLICATIONS

International Search Report mailed Sep. 8, 2021, for priority International Patent Application No. PCT/EP2021/066826.

* cited by examiner

CUTTING UNIT

TECHNICAL FIELD

The invention relates to a cutting unit for providing transversal cuts to packaging containers being connected to each other by transversal seals. The present invention also relates to a method for providing transversal cuts, as well as to a computer program and to a computer-readable medium.

BACKGROUND ART

Carton-based packaging containers have been commercially available for many years. One example is the tetrahedron shape, which was developed already in the 1950s and this type of packaging container has proven to be very suitable for various food products such as juice drinks, mils, spreadable cheese, ice-lollies, etc. The general technical packaging concept for carton-based packaging containers is based on forming a tube by sealing two longitudinal ends of a web of packaging material to each other, filling the tube with the content to be packaged, and providing upper and bottom transversal seals to the tube in order to seal individual packaging containers. While the tetrahedron shape is obtained by providing the upper and bottom transversal seals approximately perpendicular to each other, other rectangular shaped packaging containers are obtained by arranging the upper and bottom transversal seals in parallel with each other. During the transversal sealing, or immediately after, the downstream packaging container is separated from the upstream tube by a transversal cut close to the transversal seal.

The transversal cut is provided by means of a cutting unit. The cutting unit has a knife acting against an anvil, whereby the connected packaging containers are fed through a distance between the knife and the anvil. As the knife moves towards the anvil, it will cut through a transversal seal of a packaging container thereby separating the packaging container from the upstream series of connected packaging containers.

For some packaging containers, such as the above-mentioned example of ice-lollies, it may be desired to keep a certain number of individual packaging containers connected by means of perforations in a string, thereby allowing a consumer to easily draw one individual ice-lolly from the string upon use. As the string of connected packaging containers must have a limited length a dedicated cutting unit is equipped with a knife and a perforation tool operating on the sealed series of connected packaging containers in an alternating manner.

Although such a solution will provide the desired result of alternating cuts and perforations, a vast amount of manual configuration is needed for changing operational parameters such as tube material thickness, and the frequency and order of cuts and perforations.

There is thus a need for an improved cutting unit providing a flexible and versatile configuration so that the cutting unit can be easily adjusted to different cutting and perforation schemes.

SUMMARY

It is an object of the invention to at least partly overcome one or more of the above-identified limitations of the prior art. In particular, it is an object to provide a cutting unit having a rotatable anvil which, depending on rotational position, allows an associated knife to either cut or perforate the packaging material.

To solve these objects a cutting unit is provided. The cutting unit is configured to provide transversal cuts and/or perforations to a string of packaging containers connected by transversal seals. The cutting unit comprises a knife assembly and an anvil assembly rotatable against each other to form a nip for receiving a transversal seal of the string of packaging containers. The anvil assembly comprises an anvil blade having a first region and a second region such that when the first region is aligned with a knife blade of the knife assembly at the nip a cut is produced, and when the second region is aligned with the knife blade at the nip a perforation is produced.

The hereby disclosed cutting unit provides the advantage of being able to control, for each revolution of the anvil assembly, which one of the first or second regions of the anvil blade that will form the nip together with the knife blade. Thereby it is also possible to determine, for each revolution of the anvil assembly, if a cut or a perforation is to be produced.

The first and second regions may be arranged on a common anvil surface. Simplified control of the operation of the cutting unit is thereby accomplished.

The anvil surface may be curved. Preferably, the anvil surface is having an eccentric radius. Each position of the anvil surface will thereby provide a pre-determined action due to its distance to the knife blade. In other words, the nip width can be controlled over the area of the first and second regions.

The first region may have a uniform surface. Accordingly, a homogenous cutting action will be effected across the entire width of the transversal seal of the packaging container.

In an embodiment, the second region is provided with a plurality of depressions. The cutting action will thereby be reduced at the position of a depression which will lead to a perforation across the width of the transversal seal.

The depth of each depression may increase in a circumferential direction away from the first region. This means that it will be possible to control the level of perforation by controlling which position at the second region of the anvil blade that will form the nip with the knife blade. A more shallow depression will lead to a less distinct difference between a cutting action and a perforation action, while the opposite applies for a deeper depression.

The width of each depression may increase in a circumferential direction away from the first region. It is thus also possible to control the dimensions of the perforation, i.e. the lateral ratio between a cutting action and a perforation action.

Each depression may be triangular shaped. Hence, a linear relationship between perforation action width and rotational positioning of the anvil blade is thereby accomplished.

The depressions may be arranged in at least one linear array. A linear perforation is thereby accomplished, which provides facilitated tear opening of the consumer.

The depressions of a common array may be spaced apart at an equal transversal distance. This also improves the tear opening for a user, as the force required to open the perforation will be constant.

The cutting unit may further comprise a control unit configured to control the rotation of the anvil assembly relative the knife assembly such that the nip is formed between the knife blade and a pre-determined position of the anvil blade. Automatic control of the action of the cutting unit is thereby allowed, leading to great flexibility in defining the properties of the final product, i.e. the string of packaging containers.

According to a second aspect, a method for providing transversal cuts and/or perforations to a string of packaging containers connected by transversal seals is provided. The method comprises i) feeding said string of packaging containers through a cutting unit such that a transversal seal of the string of packaging containers is received between a knife assembly and an anvil assembly, and ii) rotating the knife assembly and the anvil assembly such that a transversal seal of the string of packaging containers is received by a nip formed between a knife blade of the knife assembly and an anvil blade of the anvil assembly. If the nip is formed between the knife blade and a first region of the anvil blade, a cut is produced, and if the nip is formed between the knife blade and a second region of the anvil blade, a perforation is produced.

According to a third aspect, a computer program is provided. The computer program comprises instructions to cause the cutting unit of the first aspect to execute the steps of the method of the second aspect.

According to a fourth aspect, a computer-readable medium is provided. The computer-readable medium is having stored thereon the computer program of the third aspect.

Still other objectives, features, aspects and advantages of the invention will appear from the following detailed description as well as from the drawings.

BRIEF DESCRIPTION OF THE DRAWINGS

Embodiments of the invention will now be described, by way of example, with reference to the accompanying schematic drawings, in which.

DETAILED DESCRIPTION

Figure 1:
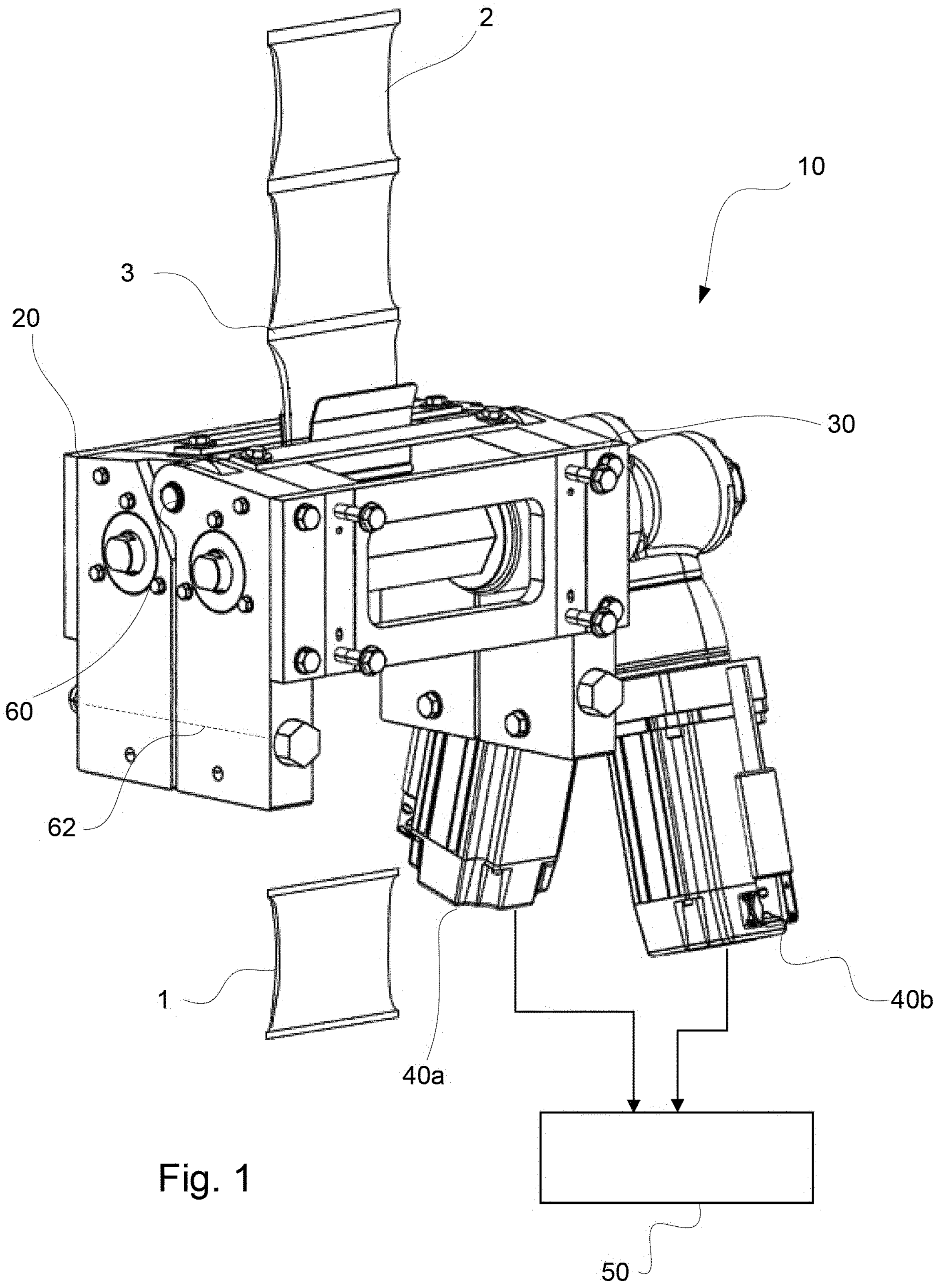
FIG. 1 is a perspective view of a cutting unit according to an embodiment.

With reference to FIG. 1 a cutting unit 10 is illustrated. The cutting unit 10 typically forms part of a roll-fed packaging machine being configured to form, fill and seal individual packaging containers 1 by transforming a web of packaging material into a longitudinally sealed tube. The tube is partially filled with its intended content before transversal seals are provided to the tube in order to form a string 2 of packaging containers 1 connected to each other by the transversal seals 3. This process is well-known in the art and has been made commercially successful by AB Tetra Pak.

The cutting unit 10 is arranged at a position of the packaging machine so that it receives the string 2 of packaging containers 1. As can be seen in FIG. 1, the purpose of the cutting unit 10 is to apply a cut to the string 2 at the position of the transversal seal 3, so that one or more packaging containers 1 are separated from the upstream string 2. However, as will be further explained in the following, the cutting unit 10 is also capable of providing a perforation to the string 2.

The cutting unit 10 comprises a knife assembly 20 and an anvil assembly 30. The knife assembly 20 is driven in a rotational manner by a first motor 40*a*. In a similar manner, the anvil assembly is driving in a rotational manner by a second motor 40*b*. The first and second motors 40*a-b* are preferably servo motors, allowing for precise rotational control of the knife assembly 20 and the anvil assembly 30.

A control unit 50 forms part of the cutting unit 10 and is programmed to provide control signals for the motors 40*a-b* in order to control the rotation of the knife assembly 20 and the anvil assembly 30. The knife assembly 20 is connected to the anvil assembly 30 by means of a pivot point 60. A spring 62 applies a spring force between the knife assembly 20 and the anvil assembly 30 so that precise positioning of the knife assembly and the anvil assembly is possible.

The cutting unit 10 is preferably arranged in a horizontal direction, so that it can receive a vertically running string 2 of packaging containers 1.

Figure 2:
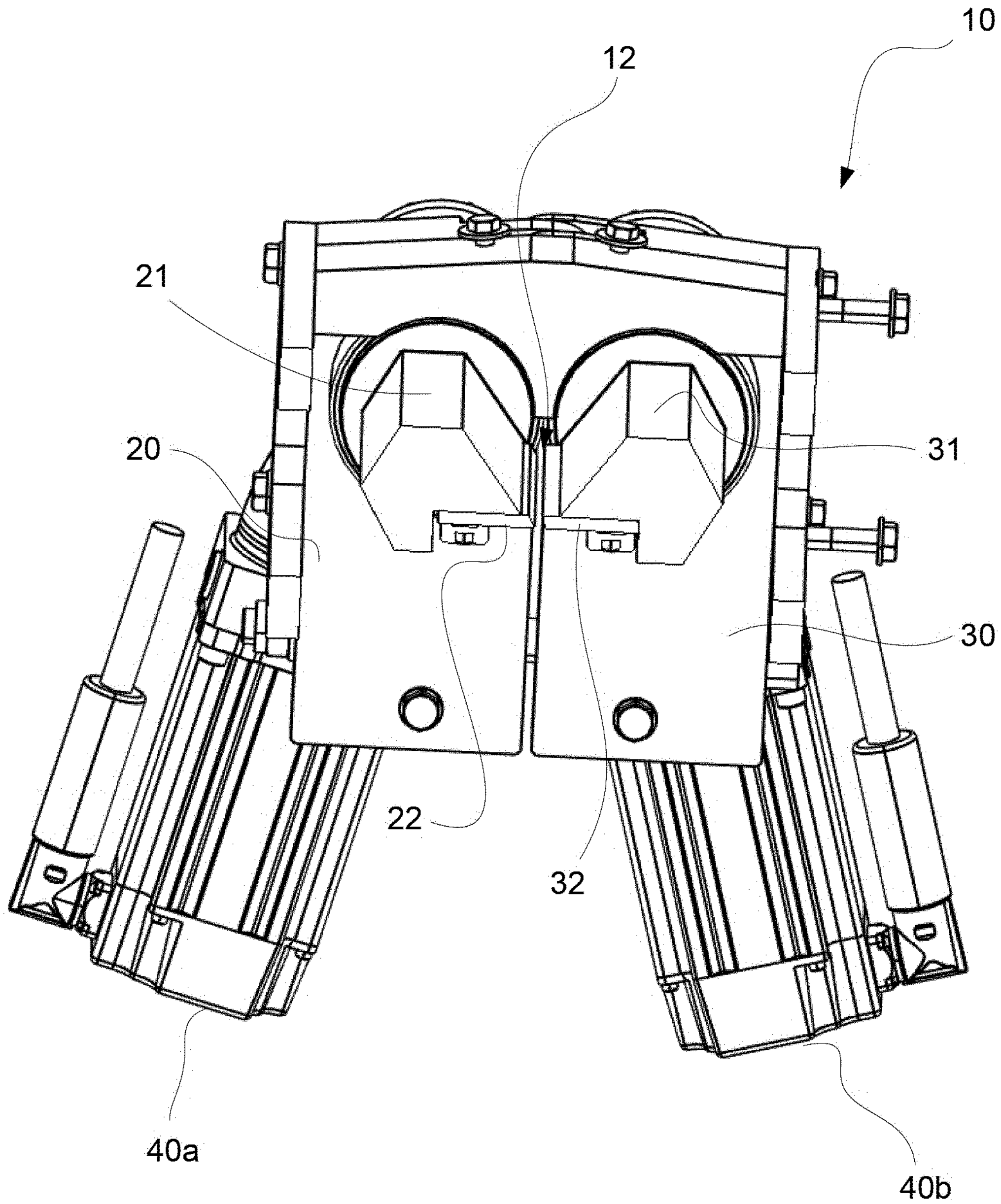
FIG. 2 is a cross-sectional view of the cutting unit shown in FIG. 1.

A cross-sectional view of the cutting unit 10 is shown in FIG. 2. The knife assembly 20 comprises a rotational shaft 21 which is driven by the motor 40*a*. The rotational shaft 21 is carrying a knife blade 22. In a similar manner the anvil assembly 30 comprises a rotational shaft 31 which is driven by the motor 40*b*. The rotational shaft 31 is carrying an anvil blade 32.

The knife blade 22 and the anvil blade 32 define a nip 12 when they are arranged in a respective position facing each other, as shown in FIG. 2. When a string 2 of packaging containers 1 is received in said nip 12, a cut or a perforation will be produced. By controlling the rotation of the knife assembly 20 and the anvil assembly 30, it is thus possible to also determine at which position of the string 2 the cut/perforation is to be applied.

Figure 3A:
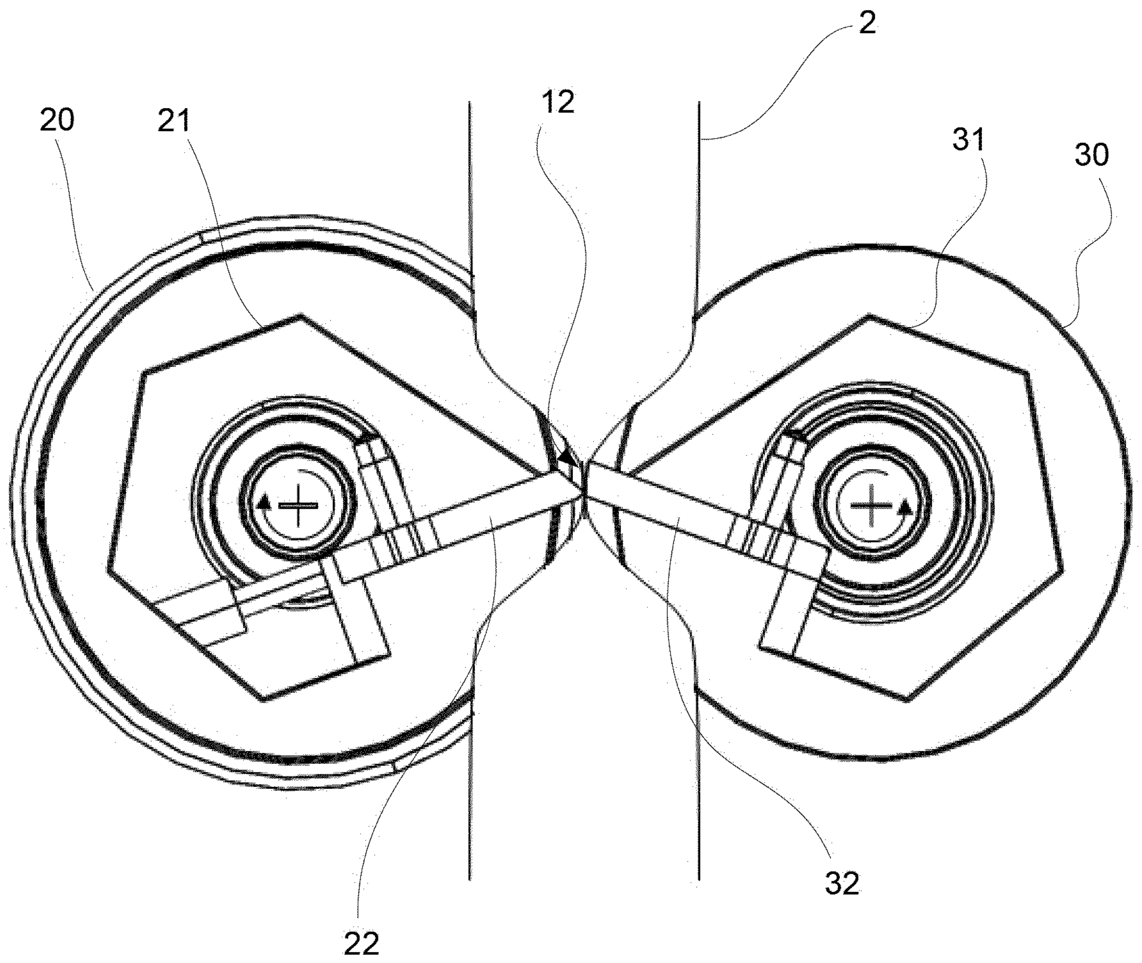
FIGS. 3*a-b* are cross-sectional views showing the relative position of a knife and an anvil during operation of the cutting unit.

In FIG. 3*a* a more detailed cross-sectional view of the cutting unit 10 is shown. A string 2 is schematically shown to further increase the understanding of how the cutting unit 10 operates.

As is shown the rotational shafts 21, 31 are similar in shape, wherein the cross-section is in the form of a polygon. The shape of the rotational shafts 21, 31 allow the respective shaft 21, 31 to change its lateral distance to the string 2 as the shafts 21, 31 rotate. Hence, at the rotational positions shown in FIG. 3*a*, the shafts 21, 31 provide the minimum distance between each other thereby forming the nip 12. Preferably, at this position the knife blade 22 is not in full contact with anvil blade 32. As an example, the nip 12 may be formed by a lateral distance of approximately 5-20 μm between the knife blade 22 and the anvil blade 32. This is particularly advantageous for packaging material having a core layer of carton based material, since such a material will break by the sudden compression formed at the nip 12 thereby still causing a cutting action. Still, the wear of the knife blade 22 is greatly reduced since there is no actual contact between the knife blade 22 and the anvil blade 32.

As the shafts 21, 31 continue to rotate in the directions indicated in FIG. 3*a*, the knife blade 22 and the anvil blade 32 will move further away from each other. Due to the non-circular shape of the shafts 21, 31, the lateral distance between the shafts 21, 31 will also increase thereby allowing the string 2 to pass the cutting unit 10.

Figure 3B:
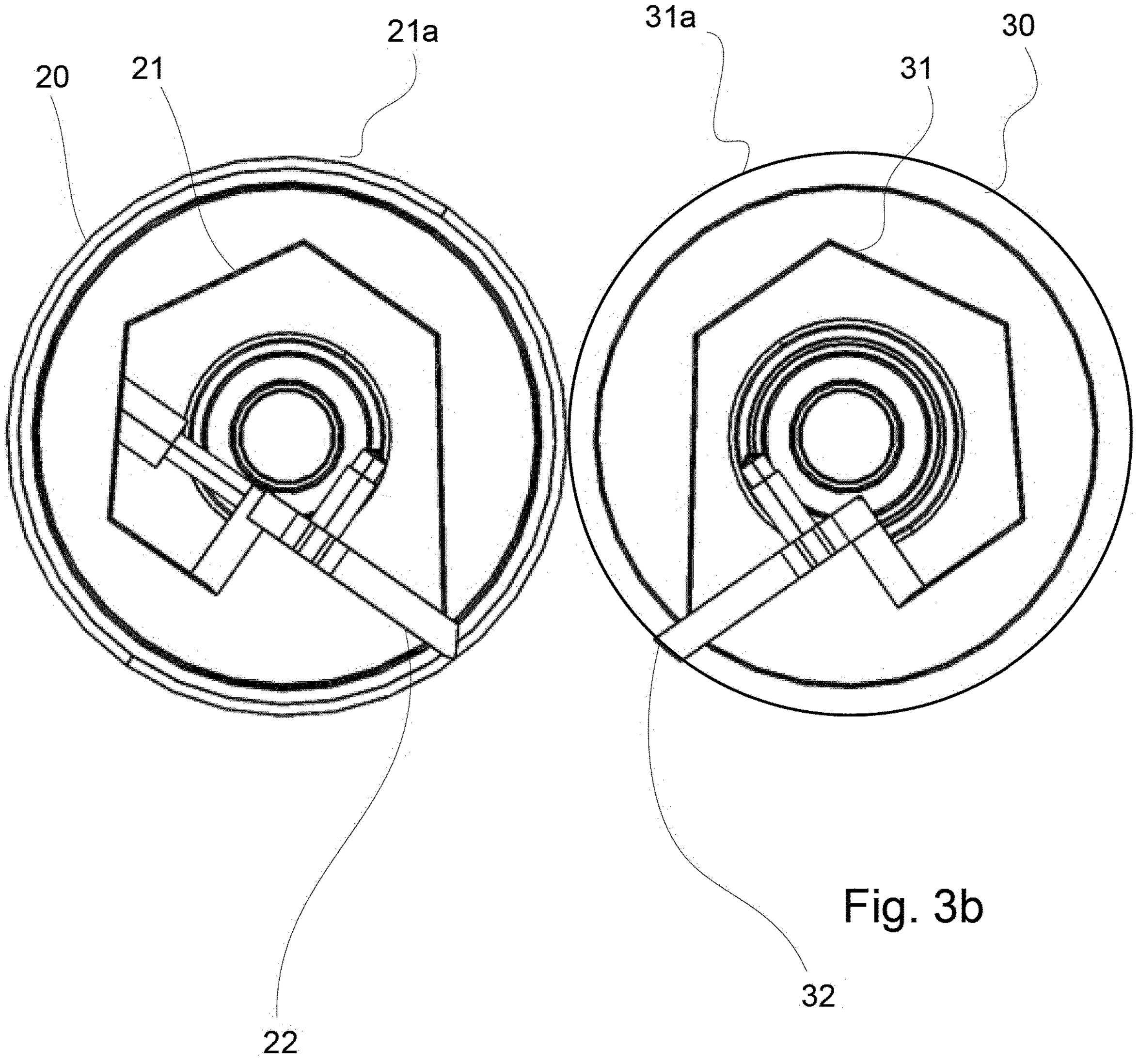

Such position of the knife assembly 20 and of the anvil assembly 30 is shown in FIG. 3*b*, from which it is clear that the string 2 may pass without being compressed by means of the shafts 21, 31. Once the shafts 21, 31 return to their relative minimum distance of FIG. 3*a*, the nip 12 is formed again thereby causing a cut or perforation to be produced at the clamped string 2 of packaging containers 1.

Each end of the respective rotational shaft 21, 31 is provided with a ring 21*a-b*, 31*a-b*. The rings 21*a-b* of the knife assembly 20 are fixed, while the rings 31*a-b* of the anvil assembly are provided with bearings. During the assembly of the cutting unit 100 the rings 21*a-b*, 31*a-b* are pressed against each other by means of the spring 62 (see FIG. 1) at a force of approximately 2-5 kN. As the anvil assembly 30 is provided with the bearings inside the rings 31*a-b*, rotational control of the anvil assembly 30 relative the knife assembly 20 is still possible.

Figure 4A:
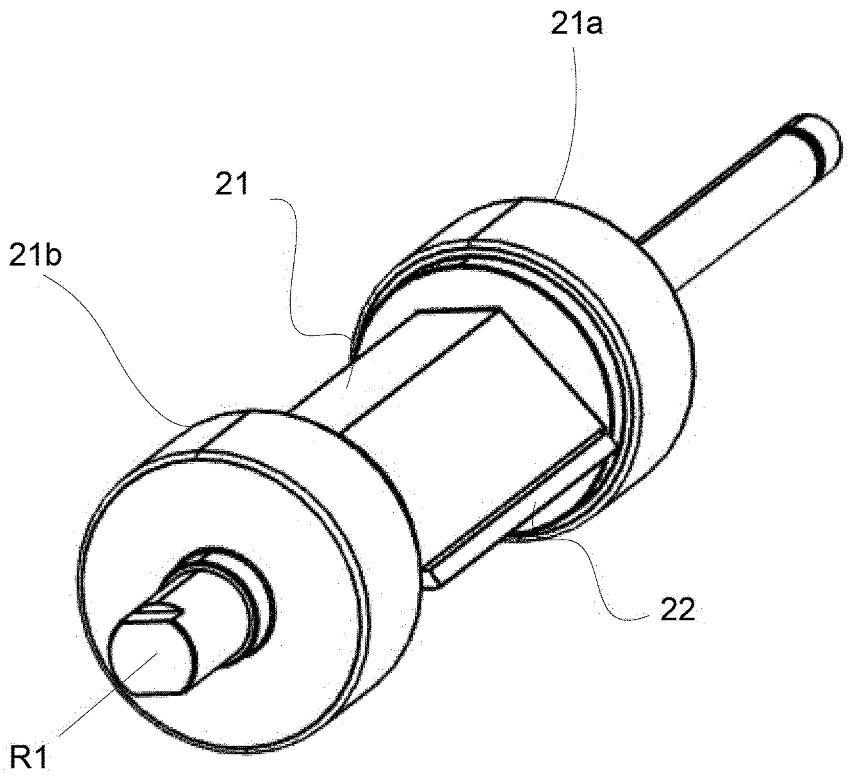
FIG. 4*a* is a perspective view of a knife assembly forming part of a cutting unit.
Figure 4B:
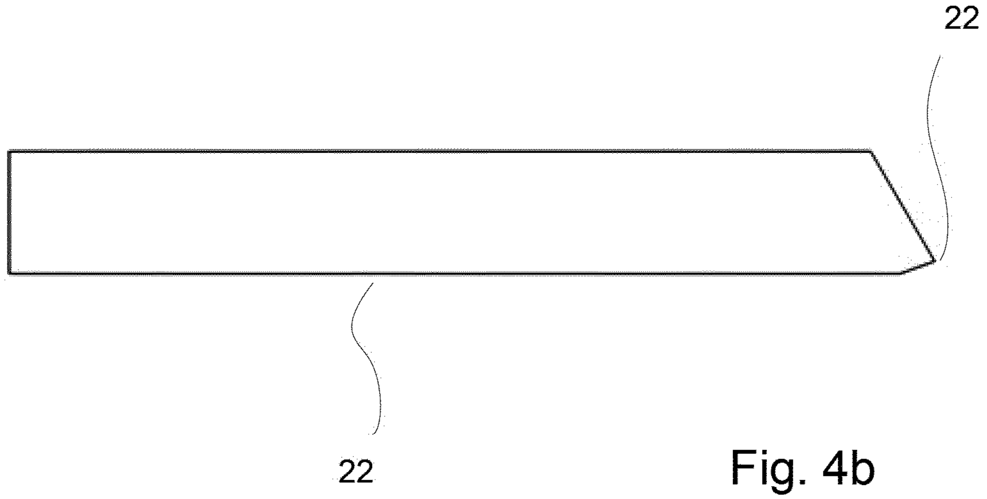
FIG. 4*b* is a side view of a knife blade forming part of the knife assembly shown in FIG. 4*a;*

An example of the knife assembly 20 is shown in more detail in FIGS. 4*a-b*. As is shown in FIG. 4*a*, the knife blade 22 is mounted to the shaft 21 so that the knife blade 22 extends along the shaft 21 in its axial direction. Screws or bolts may be used to secure the knife blade 22 to the rotational shaft 21. The shaft 21 forms a circumferential surface, whereby the knife blade 22 protrudes radially at one specific circumferential position of the shaft 21. The knife blade 22 will thereby only be active once during a full revolution of the shaft 21.

The length of the knife blade 22 is designed to cover at least the entire width of the transversal seal 3 to be cut. The knife blade 22 is arranged in parallel with the rotational axis R1 of the shaft 21.

As can be seen in FIG. 4*b*, the knife blade 22 is provided with an edge 23, which forms the most radial projection of the knife assembly 20. The edge 23 may be planar on a microscopic level, such that the width of the edge 23 is approximately 10-30 μm. The knife blade 22 is preferably made of carbide.

Figure 5A:
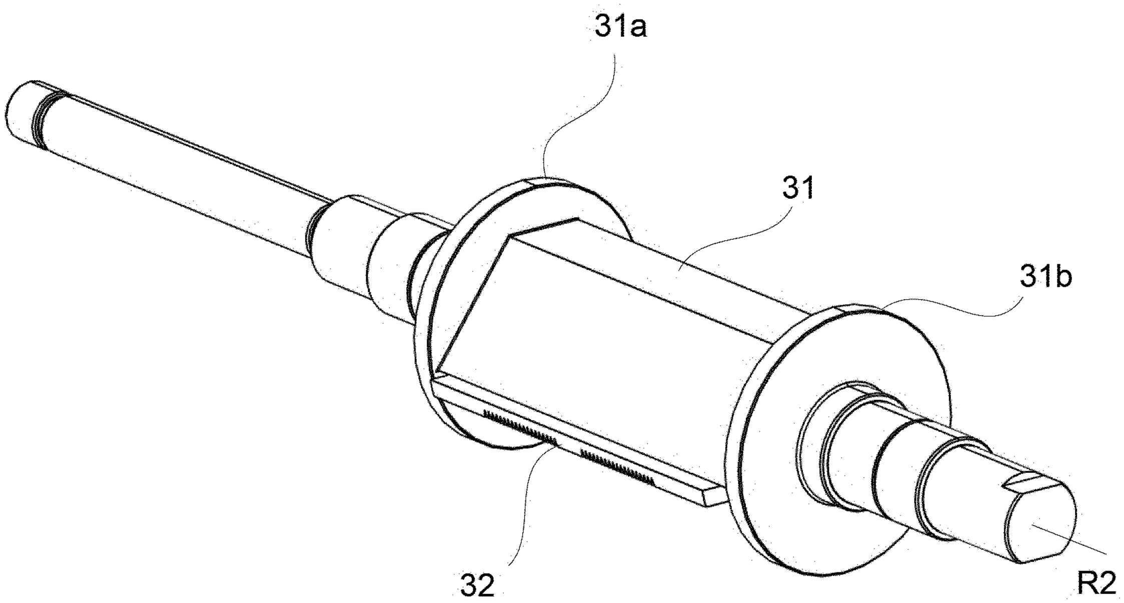
FIG. 5*a* is a perspective view of an anvil assembly forming part of a cutting unit.

An example of the anvil assembly 30 is shown in more details in FIGS. 5*a-d*. As is shown in FIG. 5*a*, the anvil blade 32, which is preferably made of carbide, is mounted to the shaft 31 so that the anvil blade 32 extends along the shaft 31 in its axial direction. Screws or bolts may be used to secure the anvil blade 32 to the rotational shaft 31. The shaft 31 forms a circumferential surface, whereby the anvil blade 32 protrudes radially at one specific circumferential position of the shaft 31. As for the knife blade 22, the anvil blade 32 will thereby only be active once during a full revolution of the shaft 31.

The length of the anvil blade 32 is designed to cover at least the entire width of the transversal seal 3 to be cut. The anvil blade 32 is arranged in parallel with the rotational axis R2 of the shaft 31.

Figure 5B:
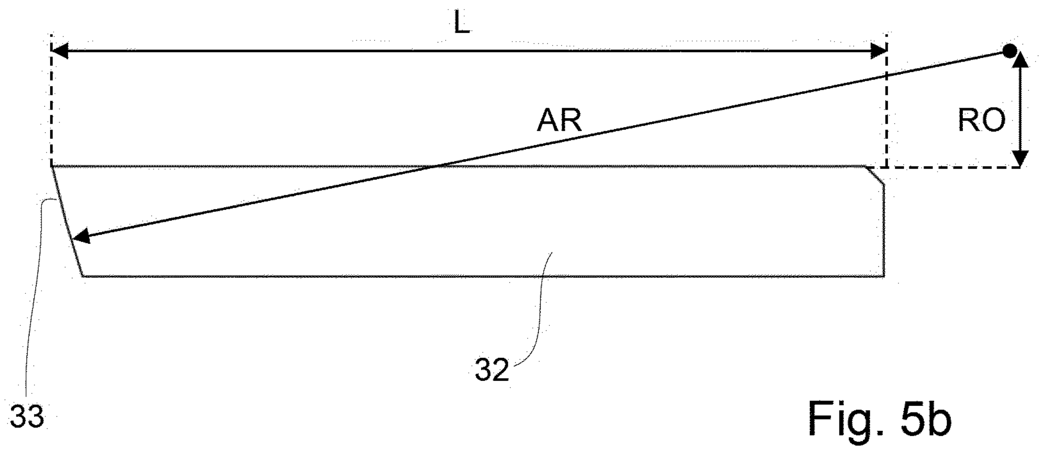
FIG. 5*b* is a side view of an anvil blade blade forming part of the anvil assembly shown in FIG. 5*a;*

As can be seen in FIG. 5*b*, the anvil blade 32 is provided with an anvil surface 33, which forms the most radial projection of the anvil assembly 30. The anvil surface 33 is curved in the circumferential direction. As is shown in FIG. 5*b*, the anvil surface 33 is having an radius AR. The radius AR, which may be in the range of 55 mm, is preferably eccentric. The length L of the anvil blade 32 may be approximately 45 mm, and the radius offset RO, as indicated in FIG. 5*b*, may be approximately 10 mm. By providing the anvil blade 32 with a slope-shape having an eccentric radius it was proven to be possible to control the width of the nip 12 from 0-20 μm, approximately, by controlling which exact position of the curved anvil surface 33 that acts to form the nip 12 together with the edge 23 of the knife blade 22.

Figure 5C:
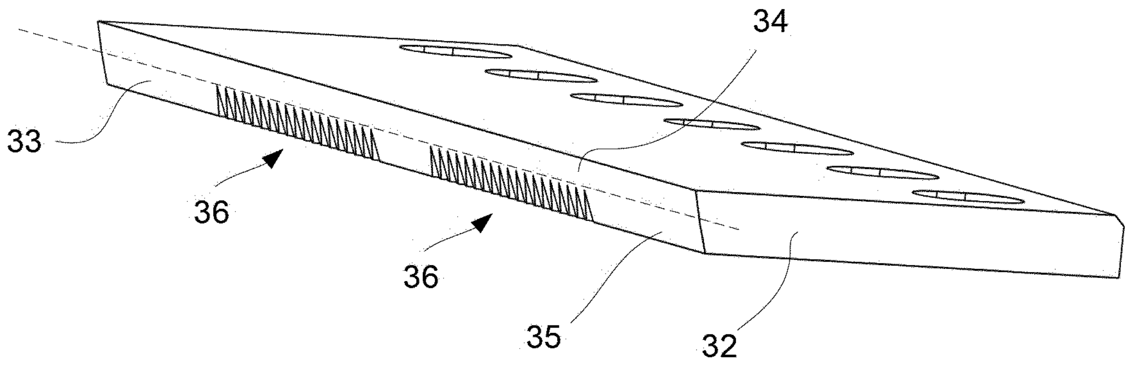
FIG. 5*c* is a perspective view of the anvil blade according to an embodiment.
Figure 5D:
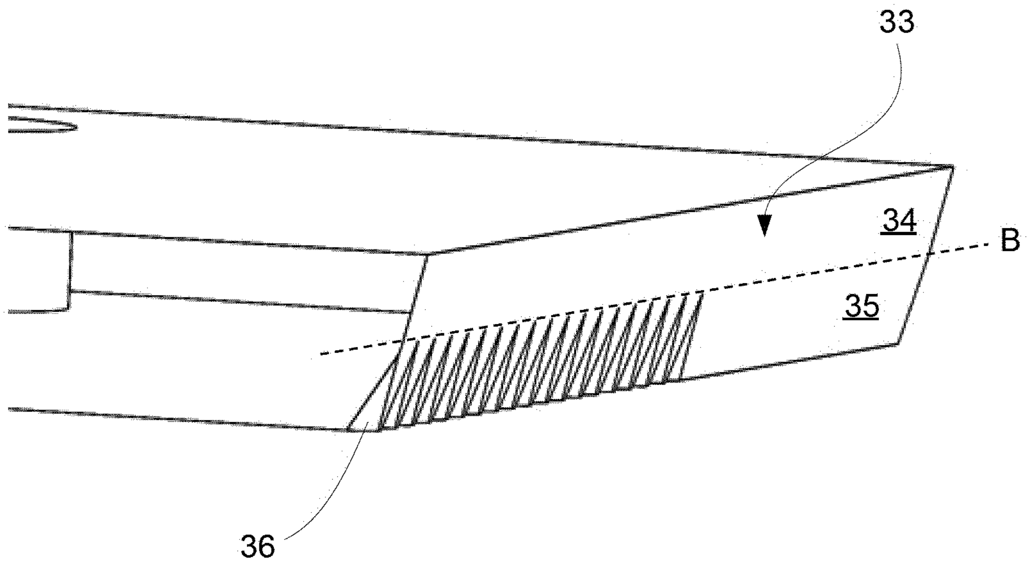
FIG. 5*d* is a cross-sectional view of the anvil blade shown in FIG. 5*c;*

Now referring to FIGS. 5*c-d*, the anvil blade 32 is having a first region 34 and a second region 35 such that when the first region 34 is aligned with the knife blade 22 at the nip 12 a cut is produced, and when the second region 35 is aligned with the knife blade 22 at the nip 12 a perforation is produced. Both regions 34, 35 are preferably arranged within the anvil surface 33 such that the anvil surface 33 is entirely made up of the first and second regions 34, 35. The first region 34 forms an upper portion of the anvil surface 33, while the second region 35 forms a bottom portion of the anvil surface 33.

While the first region 34 is provided with a uniform surface, the second region 35 is provided with a plurality of depressions 36. In the shown example, the depressions 36 are triangular shaped having the apex of each triangular arranged at the boundary B between the first and second regions 34, 35. The depth of each depression 36 is increasing in a circumferential direction away from the first region 34, i.e. in a direction away from the apex. Due to the triangular shape, the width of each depression 36 is also increasing in a circumferential direction away from the first region 34.

As shown in FIG. 5*c*, the depressions 36 of the second region 35 are arranged in a linear arrays. In the shown example the linear array of depressions 36 form a first set of depressions 36 spaced apart in the linear direction from a second set of depressions 36. In each set of depressions 36, the depressions 36 are spaced apart at an equal transversal/linear distance.

The construction of the anvil blade 32, and especially the curved anvil surface 33 being provided with the first region 34 and the second region 35, allows precise control of the width of the nip 12, as well as control of whether to produce a cut or a perforation.

A schematic illustration of such control is given in FIGS. 6*a-d*. Starting in FIG. 6*a*, the anvil assembly 30 is controlled to rotate such that the upper part of the anvil blade 32, i.e. the upper portion of the first region 34, is forming the nip 12 with the knife blade 22. At this position, the uniform surface of the first region 34 will allow for a cut of the packaging material.

By controlling the rotation of the anvil assembly 30 slightly differently such that the bottom portion of the first region 34 will instead be aligned with the knife blade 22 to form the nip 12 (see FIG. 6*b*), the nip width is slightly increased to adjust the cutting action to a slightly thicker packaging material. This is made possible due to the eccentric radius of the anvil surface 33. As the first region 34 is still in action, a cut will be produced.

Figure 6A:
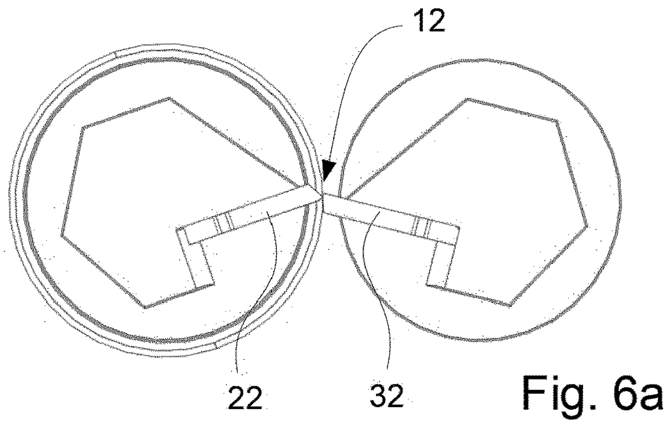
FIGS. 6*a-d* are cross-sectional views of different operation of the cutting unit.
Figure 6B:
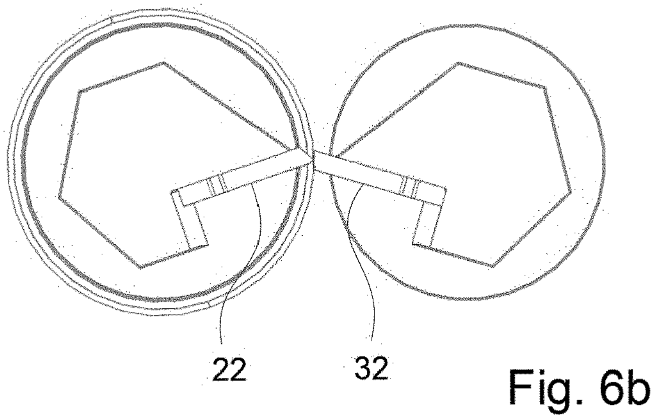
Figure 6C:
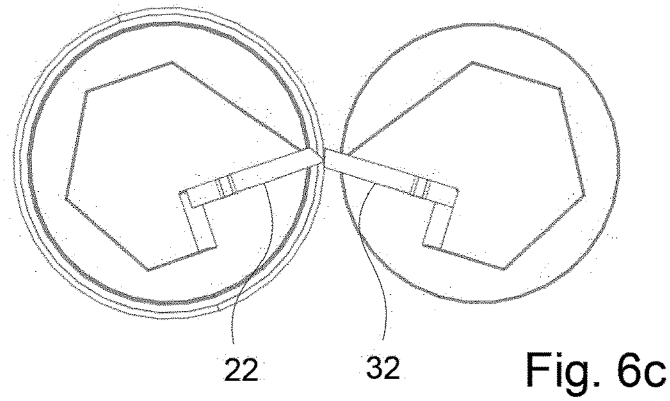

Another option is shown in FIG. 6*c*, where the anvil assembly is controlled to rotate such that an upper portion of the second region 35 is aligned with the knife blade 22 to form the nip 12. At this position the knife blade 22 will act against the anvil surface 33 having very small depressions (close to the apex of the triangular shaped depressions) such that a first perforation pattern is provided at the packaging material.

Figure 6D:
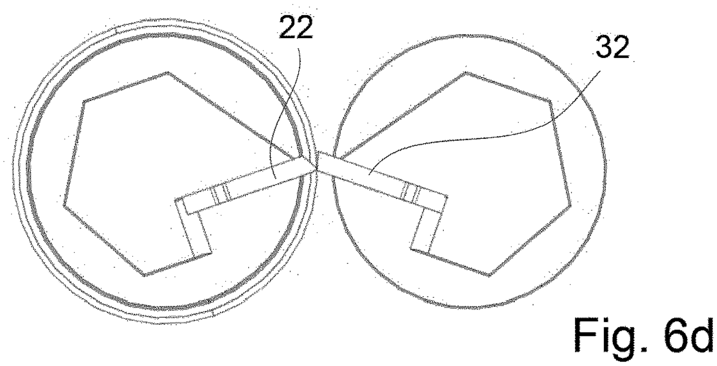

Yet further, as shown in FIG. 6*d*, the anvil assembly 30 can be controlled to rotate such that the bottom portion of the second region 35 will instead be aligned with the knife blade 22 to form the nip 12. The nip width will be slightly increased to adjust the perforation action to a slightly thicker packaging material, however also the width of each perforation is increased as the depressions 36 are wider at this position. As the second region 35 is still in action, a perforation will be produced.

Due to the uniformly curved anvil surface 33, continuous adjustment is possible between the extreme positions shown in FIGS. 6*a-d*.

Figure 7:
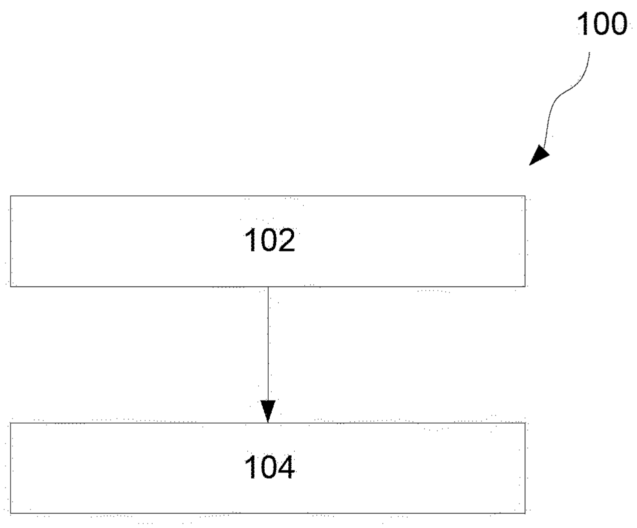
FIG. 7 is a schematic view of a method according to an embodiment.

Now turning to FIG. 7 a method 100 will be schematically described. The method 100 is performed in order to provide transversal cuts and/or perforations to a string of packaging containers connected by transversal seals. The method comprises a first step 102 of feeding the string of packaging containers through a cutting unit such that a transversal seal of the string of packaging containers is received between a knife assembly and an anvil assembly, and a second step 104 of rotating the knife assembly and the anvil assembly such that a transversal seal of the string of packaging containers is received by a nip formed between a knife blade of the knife assembly and an anvil blade of the anvil assembly. Control of the rotation of the anvil assembly is performed such that if the nip is formed between the knife blade and a first region of the anvil blade, a cut is produced, and if the nip is formed between the knife blade and a second region of the anvil blade, a perforation is produced.

From the description above follows that, although various embodiments of the invention have been described and shown, the invention is not restricted thereto, but may also be embodied in other ways within the scope of the subject-matter defined in the following claims.

The invention claimed is:

1. A cutting unit for providing transversal cuts and/or perforations to a string of packaging containers connected by transversal seals, said cutting unit comprising a knife assembly and an anvil assembly rotatable against each other to form a nip for receiving a transversal seal of the string of packaging containers, wherein the anvil assembly comprises an anvil blade having a first region and a second region such that when the first region is aligned with a knife blade of the knife assembly at the nip a cut is produced, and when the second region is aligned with the knife blade at the nip a perforation is produced;

wherein the anvil blade includes an anvil surface that is a curved surface, and the curved surface interacts with the knife blade;

wherein the second region is provided with a plurality of depressions;

wherein the depth of each depression increases in a circumferential direction away from the first region; and/or wherein the width of each depression increases in a circumferential direction away from the first region.

2. The cutting unit according to claim 1, wherein the first and second regions are arranged commonly on the anvil surface.

3. The cutting unit according to claim 2, wherein the anvil surface has an eccentric radius.

4. The cutting unit according to claim 1, wherein the first region has a uniform surface.

5. The cutting unit according to claim 1, wherein each depression is triangular shaped.

6. The cutting unit according to claim 1, wherein the depressions are arranged in at least one linear array.

7. The cutting unit according to claim 6, wherein the depressions of a common array are spaced apart at an equal transversal distance.

8. The cutting unit according to claim 1, further comprising a control unit configured to control the rotation of the anvil assembly relative the knife assembly such that the nip is formed between the knife blade and a pre- determined position of the anvil blade.

9. A method for providing transversal cuts and/or perforations to a string of packaging containers connected by transversal seals, said method comprising:

feeding said string of packaging containers through a cutting unit such that a transversal seal of the string of packaging containers is received between a knife assembly and an anvil assembly, and rotating the knife assembly and the anvil assembly such that a transversal seal of the string of packaging containers is received by a nip formed between a knife blade of the knife assembly and an anvil blade of the anvil assembly such that if the nip is formed between the knife blade and a first region of the anvil blade, a cut is produced, and if the nip is formed between the knife blade and a second region of the anvil blade, a perforation is produced, wherein the anvil blade includes an anvil surface that is a curved surface, and the curved surface interacts with the knife blade;

wherein the second region of the anvil blade is provided with a plurality of depressions;

wherein the depth of each depression increases in a circumferential direction away from the first region; and/or wherein the width of each depression increases in a circumferential direction away from the first region.

10. A non-transitory computer-readable medium having stored thereon a program for controlling a cutting unit, the cutting unit for providing transversal cuts and/or perforations to a string of packaging containers connected by transversal seals, said cutting unit comprising a knife assembly and an anvil assembly rotatable against each other to form a nip for receiving a transversal seal of the string of packaging containers, wherein the anvil assembly comprises an anvil blade having a first region and a second region such that when the first region is aligned with a knife blade of the knife assembly at the nip a cut is produced, and when the second region is aligned with the knife blade at the nip a perforation is produced, the cutting unit including a controller which, when executing the program, causes the cutting unit to provide transversal cuts and/or perforations to a string of packaging containers connected by transversal seals, by way of:

feeding said string of packaging containers through the cutting unit such that a transversal seal of the string of packaging containers is received between the knife assembly and the anvil assembly, and rotating the knife assembly and the anvil assembly such that a transversal seal of the string of packaging containers is received by a nip formed between a knife blade of the knife assembly and an anvil blade of the anvil assembly such that if the nip is formed between the knife blade and a first region of the anvil blade, a cut is produced, and if the nip is formed between the knife blade and a second region of the anvil blade, a perforation is produced, wherein the anvil assembly rotates relative to the knife assembly such that the anvil blade interacts with the knife blade during a full revolution of the anvil assembly;

wherein the second region of the anvil blade is provided with a plurality of depressions;

wherein the depth of each depression increases in a circumferential direction away from the first region; and/or ps wherein the width of each depression increases in a circumferential direction away from the first region.

11. The cutting unit according to claim 1, wherein the anvil assembly rotates relative to the knife assembly such that the anvil blade interacts with the knife blade during a full revolution of the anvil assembly.

12. The cutting unit according to claim 2, wherein the anvil surface defines the first region and the second region whereby the first region is directly adjacent to the second region, and the anvil surface entirely comprises the first region and the second region.

* * * * *